(No Model.)  4 Sheets—Sheet 1.
J. SHAKESPEARE.
CASH REGISTER AND INDICATOR.

No. 480,521. Patented Aug. 9, 1892.

Witnesses:
Walter Allen

Inventor
John Shakespeare
by Herbert W. T. Jenner
Attorney (No Model.) 4 Sheets—Sheet 2.
J. SHAKESPEARE.
CASH REGISTER AND INDICATOR.
No. 480,521. Patented Aug. 9, 1892.
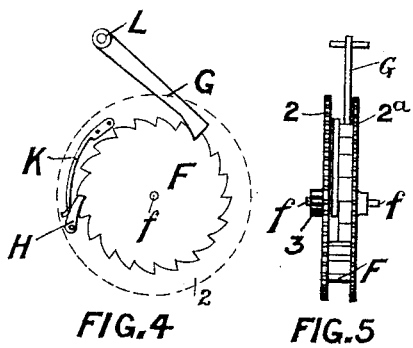
FIG. 4.   FIG. 5.
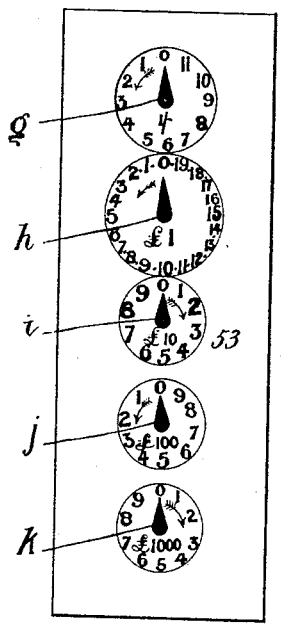
FIG. 3.
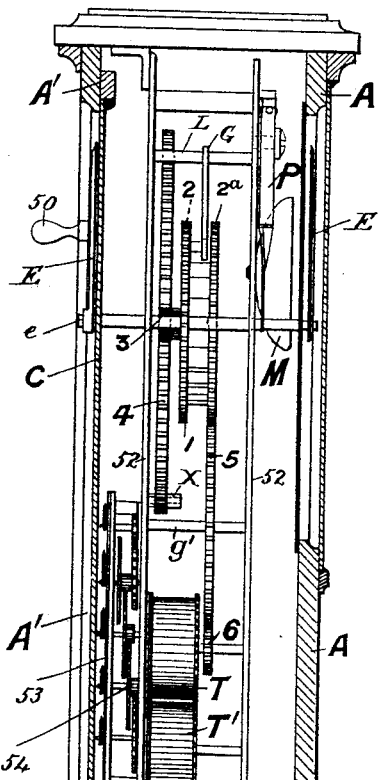
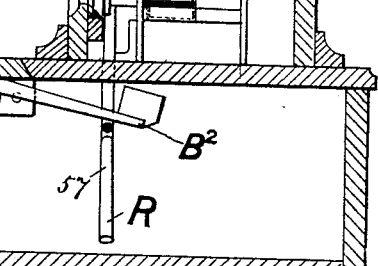
FIG. 2.
Witnesses.
Walter Allen
Jno. Meister
Inventor.
John Shakespeare
by Herbert W. Jenner
Attorney.

(No Model.)　　　　　　　　　　　　　　　4 Sheets—Sheet 3.
J. SHAKESPEARE.
CASH REGISTER AND INDICATOR.
No. 480,521.　　　　　　　　　　　Patented Aug. 9, 1892.
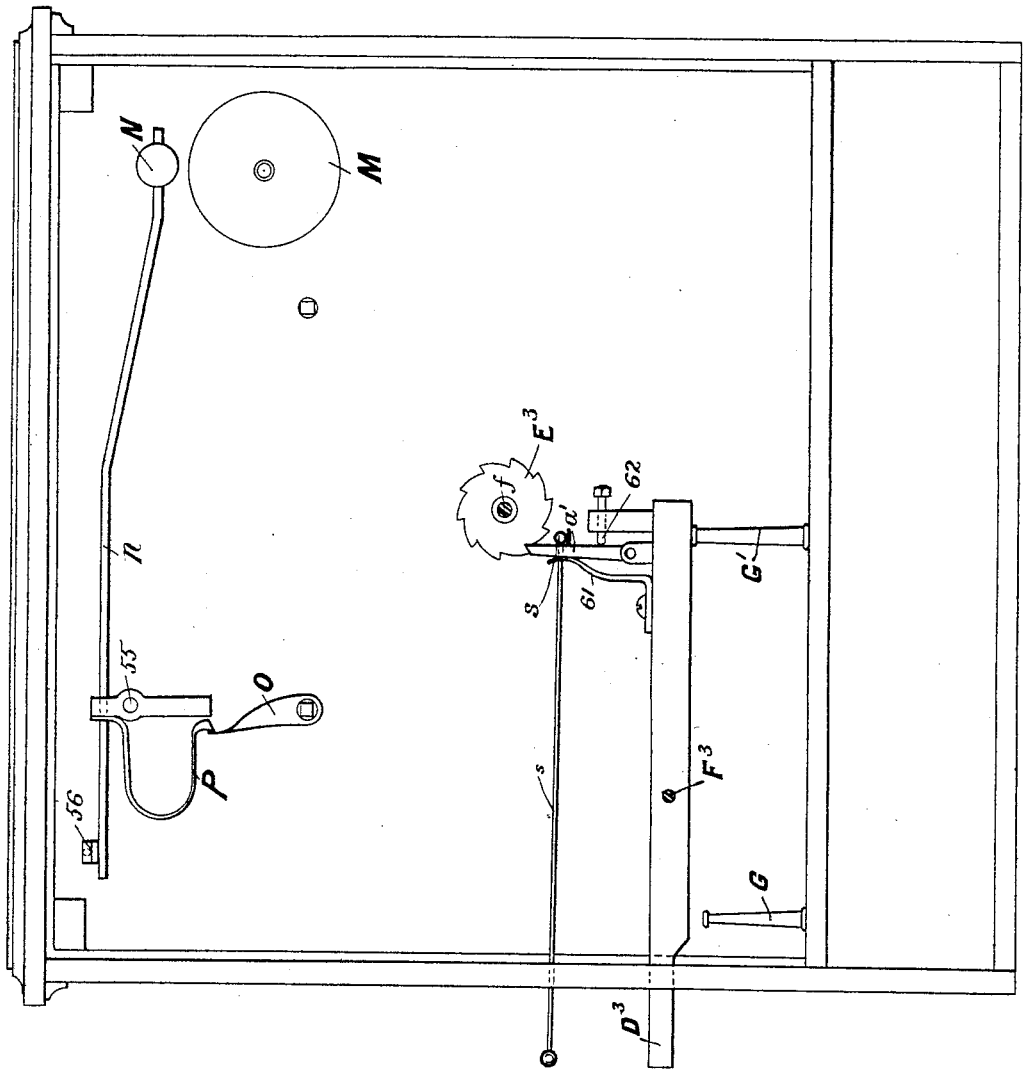

(No Model.) 4 Sheets—Sheet 4.

J. SHAKESPEARE.
CASH REGISTER AND INDICATOR.

No. 480,521. Patented Aug. 9, 1892.

Witnesses:
Walter Allen
Jno. McMaster

Inventor
John Shakespeare
by Herbert W. T. Jenner
Attorney

United States Patent Office.

JOHN SHAKESPEARE, OF DUDLEY, ENGLAND.

CASH REGISTER AND INDICATOR.

SPECIFICATION forming part of Letters Patent No. 480,521, dated August 9, 1892.

Application filed April 20, 1892. Serial No. 429,950. (No model.) Patented in England December 17, 1890, No. 20,581; in France August 21, 1891, No. 215,022, and in Belgium August 23, 1891, No. 95,734.

*To all whom it may concern:*

Be it known that I, JOHN SHAKESPEARE, a citizen of Great Britain, residing at Dudley, in the county of Worcester, England, have invented certain new and useful Improvements in Cash-Registering Appliances, (for which I have received patents in England, No. 20,581, dated December 17, 1890; in France, No. 215,022, dated August 21, 1891, and in Belgium, No. 95,734, dated August 23, 1891;) and I do hereby declare the following to be a full, clear, and exact description of the invention, such as will enable others skilled in the art to which it appertains to make and use the same.

This invention relates to cash-registers; and it consists in the novel construction and combination of the parts hereinafter fully described and claimed.

Figure 1:
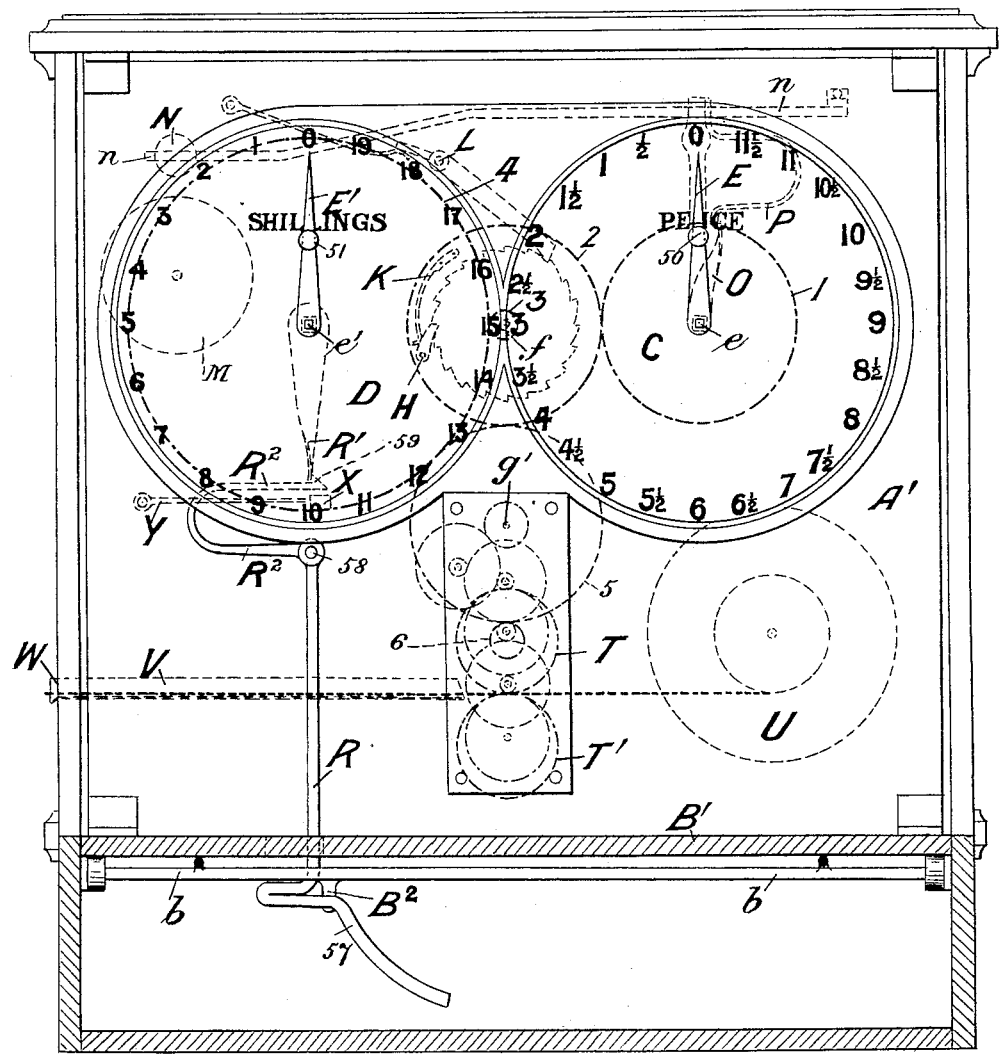
Figure 7:
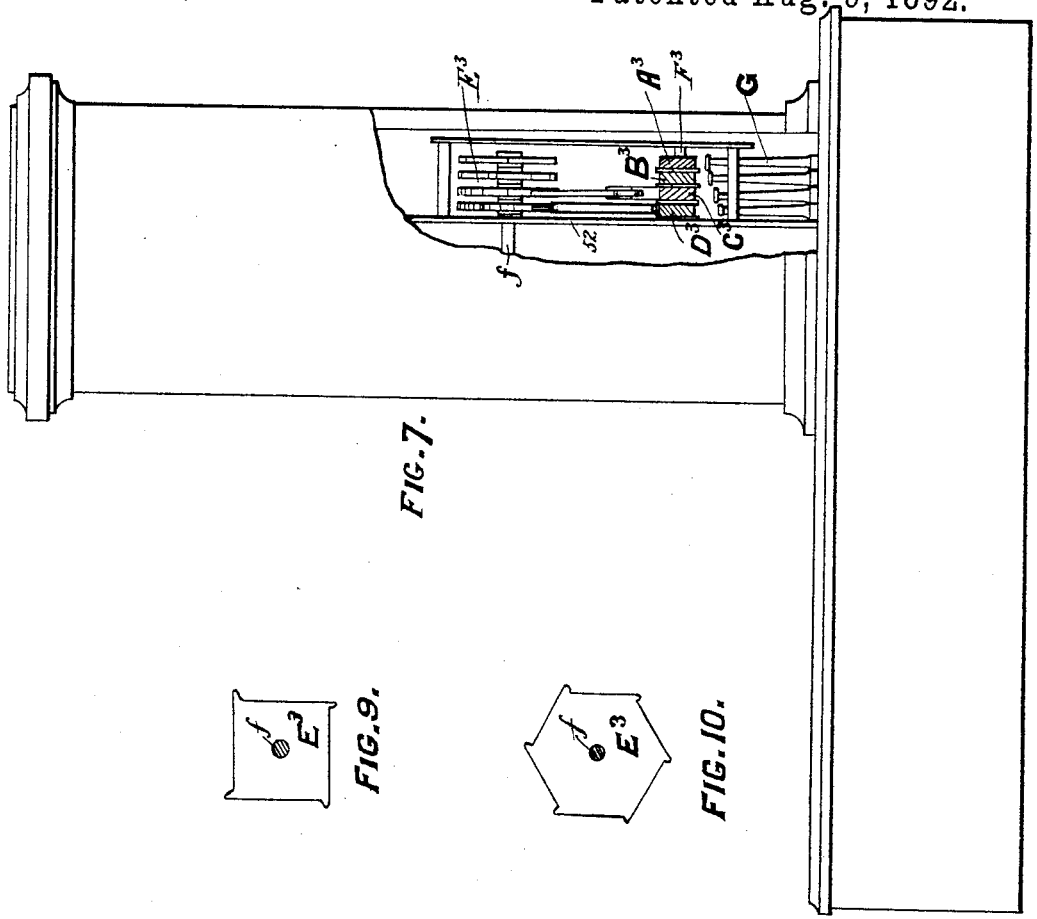
Figure 9:
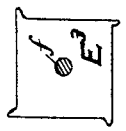
Figure 10:
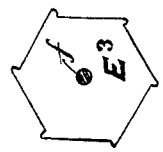
Figures 8, 11:
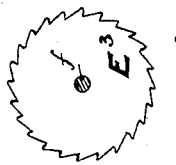

In the drawings, Figure 1 is a front view of the machine, showing the cash-receptacle in section. Fig. 2 is an end view of the machine, showing the case in section. Fig. 3 is a detail front view of the registering-dials. Fig. 4 is a face view, and Fig. 5 is a side view, of the ratchet-wheel and pawl for connecting the indicating and registering mechanism. Fig. 6 is a rear view of the bell and its actuating mechanism, also the finger-lever mechanism for operating the machine. Fig. 7 is a side view of the machine with a portion of the casing broken away to show the finger-lever mechanism. Figs. 8, 9, 10, and 11 are face views of different forms of ratchet-wheels adapted to be used in connection with the said finger-lever mechanism.

A is the back, and A' is the front, of the case of the machine. The case may be of any approved form; but it is preferably rectangular. The back A is arranged to face the purchaser, and the front A' is arranged to face the operator or salesman. Two similar dials C and D are arranged at the front and at the back of the case. The dials C are marked to denote pence, halfpence, or cents, and the dials D are marked to denote shillings or dollars. The dials C are provided with similar pointers E, secured on the ends of the shaft $e$, which is journaled in the case, and the pointer E at the front of the machine is provided with an operating-knob 50. The dials D are provided with similar pointers E', secured on the ends of the shaft $e'$, which is journaled in the case parallel with the shaft $e$, and the pointer E' at the front of the machine is provided with an operating-knob 51. A toothed wheel 1 is secured on the shaft $e$, between the frames 52, which are secured inside the case. A toothed wheel 2, similar to the toothed wheel 1, is secured on the shaft $f$, which is journaled in the frames 51, and the wheel 2 gears into the wheel 1. A toothed pinion 3 is secured to the wheel 2 on the shaft $f$, and this pinion 3 gears into a toothed wheel 4, secured upon the shaft $e'$. The diameters of the said toothed wheels are arranged so that all the pointers are moved simultaneously to indicate the same amounts on their respective dials. Thus if the dials are figured for pence and shillings one complete revolution of the pointers E from zero will cause the pointers E' to be moved a sufficient distance to indicate one shilling. The pointers are intended to be moved forward at each sale to indicate the amount of the purchase and are then moved back to zero.

A series of registering-dials 53 is provided at the front of the case, and these dials are provided with pointers $g\ h\ i\ j\ k$ and figured to register various amounts, as shown in Fig. 3. The upper dial of the series is marked to register various coins of the same denomination as the dials D, and its pointer $g$ is secured on the shaft $g'$, which is journaled in the frames 52. The remaining pointers are secured on similar shafts and are driven by a train of toothed wheels 54, as shown in Fig. 2. The shaft $g'$ has a toothed wheel 5 secured on it for driving the whole train. The toothed wheel 5 gears into a toothed wheel $2^a$, which is journaled loose upon the shaft $f$. F is a ratchet-wheel secured to the said wheel $2^a$ and also journaled on the shaft $f$. The ratchet-wheel F is driven in one direction by the pawl H, pivoted to the face of the wheel 2 and pressed into the teeth of the ratchet-wheel F by the spring K.

G is a check-pawl pivoted on the shaft L and adapted to prevent the backward movement of the ratchet-wheel. The diameters of the wheels F, $2^a$, and 5 are proportioned so that the top registering-dial registers the amounts indicated by the dials D and adds together the amounts of the successive sales. The pointers of the indicating-dials and the pointers of the registering-dials are moved forward simultaneously each time a sale is indicated; but the return movement of the indicating-pointers does not move back the registering-pointers because of the ratchet-wheel and check-pawl hereinbefore described.

M is a bell secured to one of the frames 52. This bell is struck by the hammer N each time the pointers E are moved forward from zero.

O is a trip-lever secured to the shaft $e$ and adapted to engage with the end of the bent spring P, which is secured to the hammer spring-lever $n$. The hammer-lever $n$ is pivoted to the frame by the pivot 55, and 56 is a stop for holding the hammer from touching the bell except when permitted to strike it by the elasticity of the lever $n$. The trip-lever passes under the beveled end of the spring P without ringing the bell when the pointers E are restored to zero. It is obvious that a similar bell could be operated from the shaft $e'$ of the pointers E', if desired.

B' is the lid of the cash-receptacle. This lid is opened automatically each time the bell M is struck, so that the money received may be placed in the receptacle and change taken therefrom. The lid B' is pivoted on the rod $b$ and is provided with the weighted lever $B^2$ for opening it automatically.

R is the locking-lever, provided with the horizontally-bent and downwardly-curved lower end 57, which normally supports the weighted lever and holds the lid closed.

R' is a trip-lever secured on the shaft $e'$ and adapted to actuate the locking-lever on the least forward movement of the pointers E'. The locking-lever R is pivoted on the pin 58, and its upper end is formed into a bent spring $R^2$, provided with a detent 59 for engaging with the trip-lever R'. When the pointers E' are moved forward, the trip-lever presses on the detent and moves to one side the lever R, thereby permitting the weighted lever to open the lid. The lid is closed down by hand after the money has been deposited in the receptacle, and the locking-lever R then resumes its original position by gravity. The inclined portion of the detent 59 and the spring which supports it permit the trip-lever R' to re-engage with the detent when the pointers E' are moved back to zero. It is obvious that the locking-lever could be operated from the shaft $e$ instead of from the shaft $e'$, as shown, if desired. The pointers E E' may be moved forward as many revolutions as desired; but they can only be moved back to the zero-mark. The stopping of the pointers when moved back is effected by means of the projection X on the side of the wheel 4, which comes against the end of the horizontal spring Y, which is secured to one of the frames. When the wheel is revolved forward, the projection strikes the flat upper side of the spring Y and slips past it; but when moved in the opposite direction it strikes the end of the spring and its farther movement is prevented.

The pointers may be moved by finger-levers, if desired, instead of using the knobs 50 or 51. This is effected by securing a series of ratchet-wheels $E^3$ upon the shaft $f$, as shown in Figs. 6 to 11. The shaft $f$ in Fig. 6 is the same shaft $f$ as shown in Figs. 4 and 5. It has been shown lower down in Fig. 6 than in Figs. 1 and 2; but that makes no difference to its operation.

$A^3 B^3 C^3 D^3$ are finger-levers pivoted on the shaft $F^3$ and adapted to be depressed to indicate different amounts. The inner ends of the finger-levers are heavier than the ends outside the case, and G' are stops for the said inner ends to rest on inside the case. Each finger-lever is provided with a pivoted pawl $a'$, a spring 61 for causing the pawl to engage with the teeth of the ratchet-wheel to which it pertains, and a stop 62 to prevent the pawl from being pressed too far over by the spring. A series of graduated stops G is provided under the lighter ends of the finger-levers, so that the amount of movement communicated to the shaft $f$ is regulated by the spacing of the teeth on the ratchet-wheels and the extent of the depression of the finger-levers.

The machine is also adapted to deliver paper or foil tickets, which serve as receipts for the amounts indicated. The paper or foil is formed into a roll U and mounted on a shaft, as indicated by the dotted lines in Fig. 1. The free end of the paper is carried by a horizontal guide V, and the paper is delivered through a slot W in the side of the case. The paper is fed forward by means of the rollers T and T', arranged above and below it and preferably provided with intergearing toothed flanges, as shown in Fig. 2. A toothed pinion 6 is secured on the shaft of the upper roller T and gears into the wheel 5, hereinbefore described. The size of the rollers and toothed wheels is arranged so that the length of the strip delivered is proportional to the amount of the purchase indicated on the registering-dials. The paper is preferably marked off into divisions or tickets corresponding with the coins of the denomination indicated by the pointers, and it may be perforated at the end of each division to facilitate its removal, if desired. Thus if the paper is marked with divisions each of which represents one penny and a purchase of sixpence is registered a length of paper with six of the divisions marked on it will be delivered through the slot W and may be torn off.

The finger-lever mechanism (shown in Figs. 6 to 11) is not generally intended to be used, but may be applied to make the machine acceptable to persons who prefer to use finger-levers for operating the machine. When a sale is made, the finger-lever corresponding to the amount received is depressed, thereby advancing the front indicating-pointers and the registering-pointers, as before described. The pawls $a'$ are then pressed back out of gear with all the ratchet-teeth and the indicating-pointers are restored to their zero position without turning back the registering-pointers before another sale is made and another finger-lever depressed.

In Fig. 6, S is a bar extending behind all the pawls $a'$, and $s$ is a rod connected to the said bar and projecting through the case, so that the pawls may be pulled back. When the pawls are pulled back, the pointers may be restored to zero by the knob 50.

What I claim is—

1. In a cash-register, the combination, with the two indicating-dials C and D at the opposite sides of the case, the indicating-pointers, and the toothed wheels positively connecting the shafts of the said pointers, of a ratchet-wheel, a spring-pressed pawl pivoted to one of the said wheels and adapted to turn the ratchet-wheel in one direction, a pivoted check-pawl, the registering-dials provided with pointers, and toothed wheels operatively connecting the registering-pointers with the said ratchet-wheel, substantially as set forth.

2. In a cash-register, the combination, with an indicating-pointer and its shaft, of a trip-lever secured on the said shaft, a bell, a pivoted spring-lever provided with a hammer for striking the bell, a stop for the spring-lever above its pivot and between the said stop and hammer, and a bent spring secured to the spring-lever and adapted to be actuated to cause the hammer to ring the bell each time the said pointer is moved from its zero position, the said trip-lever being adapted to pass under and re-engage with the said spring without ringing the bell when restored to its zero position, substantially as set forth.

3. In a cash-register, the combination, with an indicating-pointer and its shaft, of a pivoted locking-lever provided at its upper end with a bent spring and a detent and having a bent lower end 57, a trip-lever secured to the said shaft and adapted to engage with the said detent, a cash-receptacle provided with a pivoted lid, and a weighted lever normally resting on the said end 57 and adapted to open the lid each time the said pointer is moved forward, substantially as set forth.

4. In a cash-register, the combination, with the shaft $f$, positively connected with the indicating-pointers, of a series of ratchet-wheels secured on the said shaft and provided with teeth of different pitch, a series of pivoted finger-levers provided with spring-pressed pawls and adapted to operate the ratchet-wheels, and stops for limiting the movements of the said levers, substantially as set forth.

In testimony whereof I affix my signature in presence of two witnesses.

JOHN SHAKESPEARE.

Witnesses:
 LEO. CRAYTON MARKS,
 WILLIAM EVANS.